(12) United States Patent
Ramsdell

(10) Patent No.: US 8,042,826 B1
(45) Date of Patent: Oct. 25, 2011

(54) TRAILER HITCH CARRIAGE ASSEMBLY

(76) Inventor: Donald L. Ramsdell, Pensacola, FL (US)

( * ) Notice: Subject to any disclaimer, the term of this patent is extended or adjusted under 35 U.S.C. 154(b) by 0 days.

(21) Appl. No.: 12/722,204

(22) Filed: Mar. 11, 2010

(51) Int. Cl.
*B62D 13/00* (2006.01)

(52) U.S. Cl. ........................... 280/476.1; 280/444

(58) Field of Classification Search .............. 280/476.1, 280/444, 442, 443
See application file for complete search history.

(56) References Cited

U.S. PATENT DOCUMENTS

| | | | |
|---|---|---|---|
| 2,844,389 A | 7/1958 | Burnett | |
| 3,477,742 A * | 11/1969 | Barrington | 280/444 |
| 3,876,240 A * | 4/1975 | Watson | 280/443 |
| 4,171,825 A * | 10/1979 | Woodell | 280/443 |
| 4,253,679 A | 3/1981 | Sargent | |
| D399,803 S | 10/1998 | Hilmen | |
| 6,224,083 B1 | 5/2001 | Tyler | |
| 6,273,447 B1 | 8/2001 | Vande Berg | |
| 6,685,211 B2 | 2/2004 | Iles | |
| 6,820,887 B1 | 11/2004 | Riggle | |
| 2008/0258428 A1 | 10/2008 | Lane | |

* cited by examiner

*Primary Examiner* — Tony H. Winner

(57) ABSTRACT

A trailer hitch carriage assembly for reducing downward force on a tow vehicle and facilitating hitching of a trailer includes an axle having pivotable distal end portions and a tow bar pivotally coupled to a central portion of the axle. The tow bar has a proximal end and a distal end. A tie rod assembly is coupled to the distal end of the tow bar and has a pair of distal end portions. Each distal end portion of the tie rod assembly is pivotally coupled to a respective one of the distal end portions of the axle. A pair of hubs is included, each hub being rotationally coupled to a respective one of the distal end portions of the axle and wheels are coupled to the hubs. A trailer hitch receiver is coupled to the proximal end of the tow bar and a ball hitch is coupled to the axle.

8 Claims, 5 Drawing Sheets

TRAILER HITCH CARRIAGE ASSEMBLY

BACKGROUND OF THE DISCLOSURE

Field of the Disclosure

The disclosure relates to trailer supports and more particularly pertains to a new trailer support for reducing downward force on the rear hitch of a tow vehicle, facilitating hitching and unhitching a trailer, and providing enhanced stability during towing.

SUMMARY OF THE DISCLOSURE

An embodiment of the disclosure meets the needs presented above by generally comprising an axle having pivotable distal end portions and a tow bar pivotally coupled to a central portion of the axle. The tow bar has a proximal end and a distal end. A tie rod assembly is coupled to the distal end of the tow bar and has a pair of distal end portions. Each distal end portion of the tie rod assembly is pivotally coupled to a respective one of the distal end portions of the axle. A pair of hubs is included, each hub being rotationally coupled to a respective one of the distal end portions of the axle and wheels are coupled to the hubs. A trailer hitch receiver is coupled to the proximal end of the tow bar and a ball hitch is coupled to the axle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
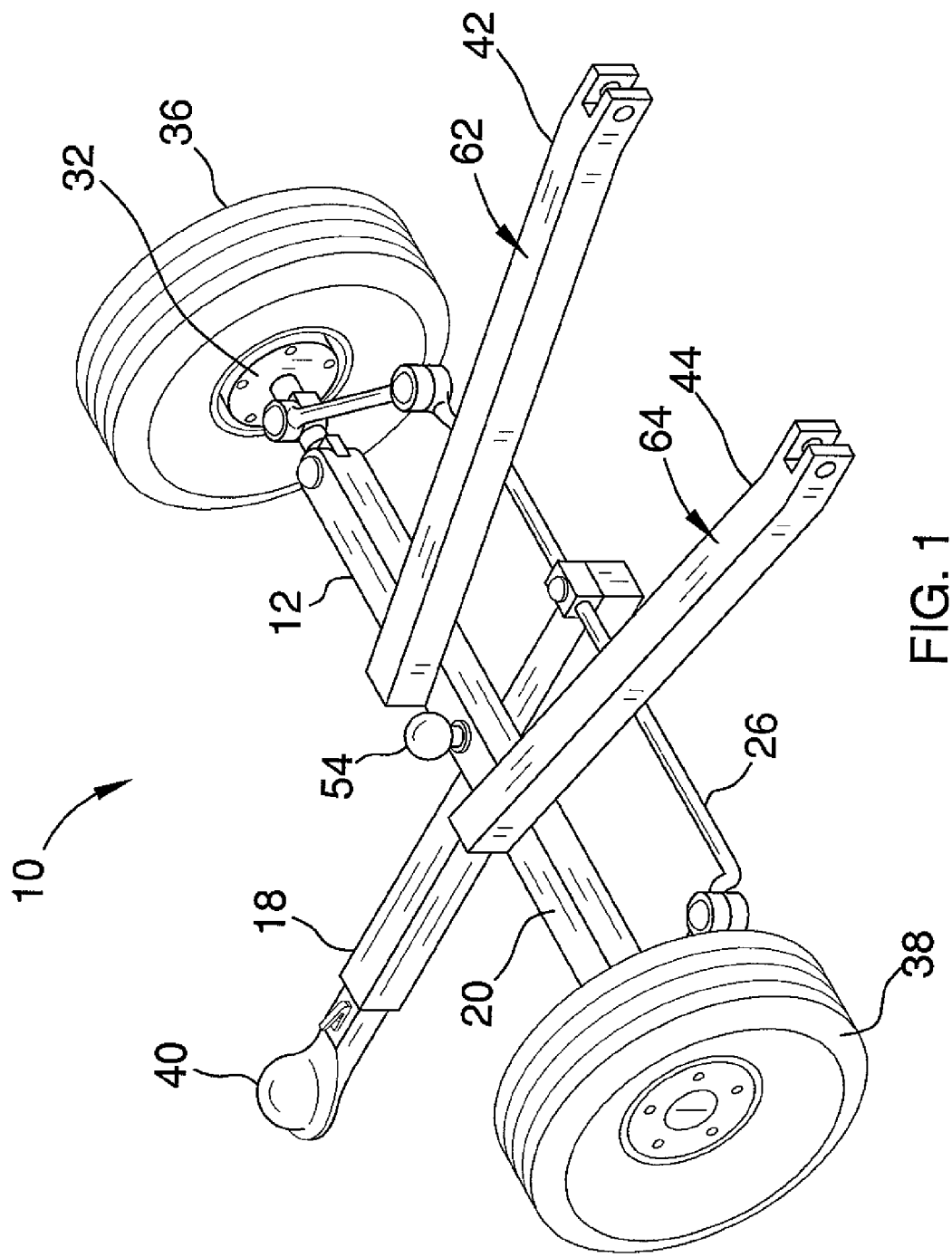
FIG. 1 is a top rear perspective view of a trailer hitch carriage assembly according to an embodiment of the disclosure.
Figure 2:
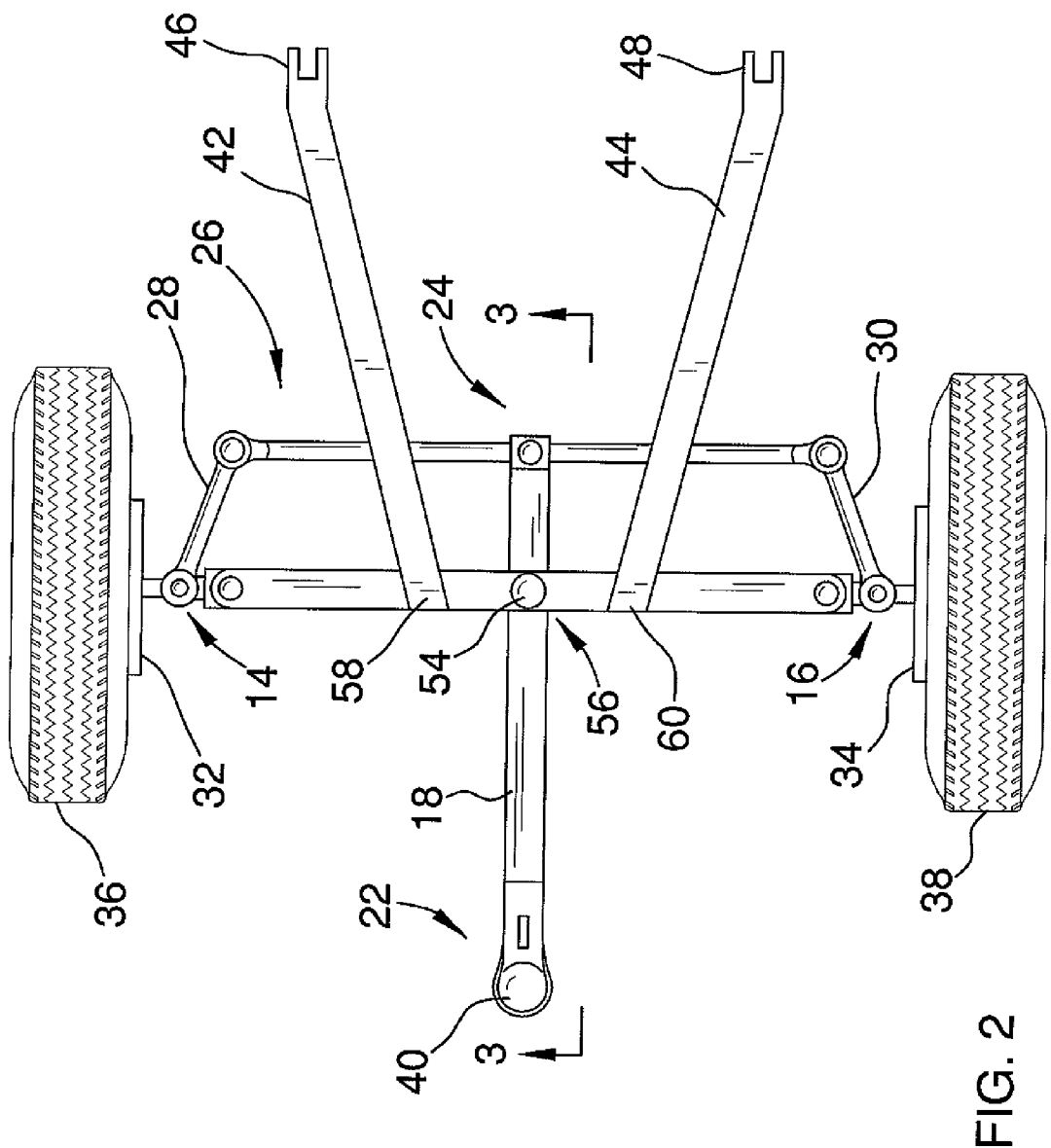
FIG. 2 is a top view of an embodiment of the disclosure.
Figure 3:
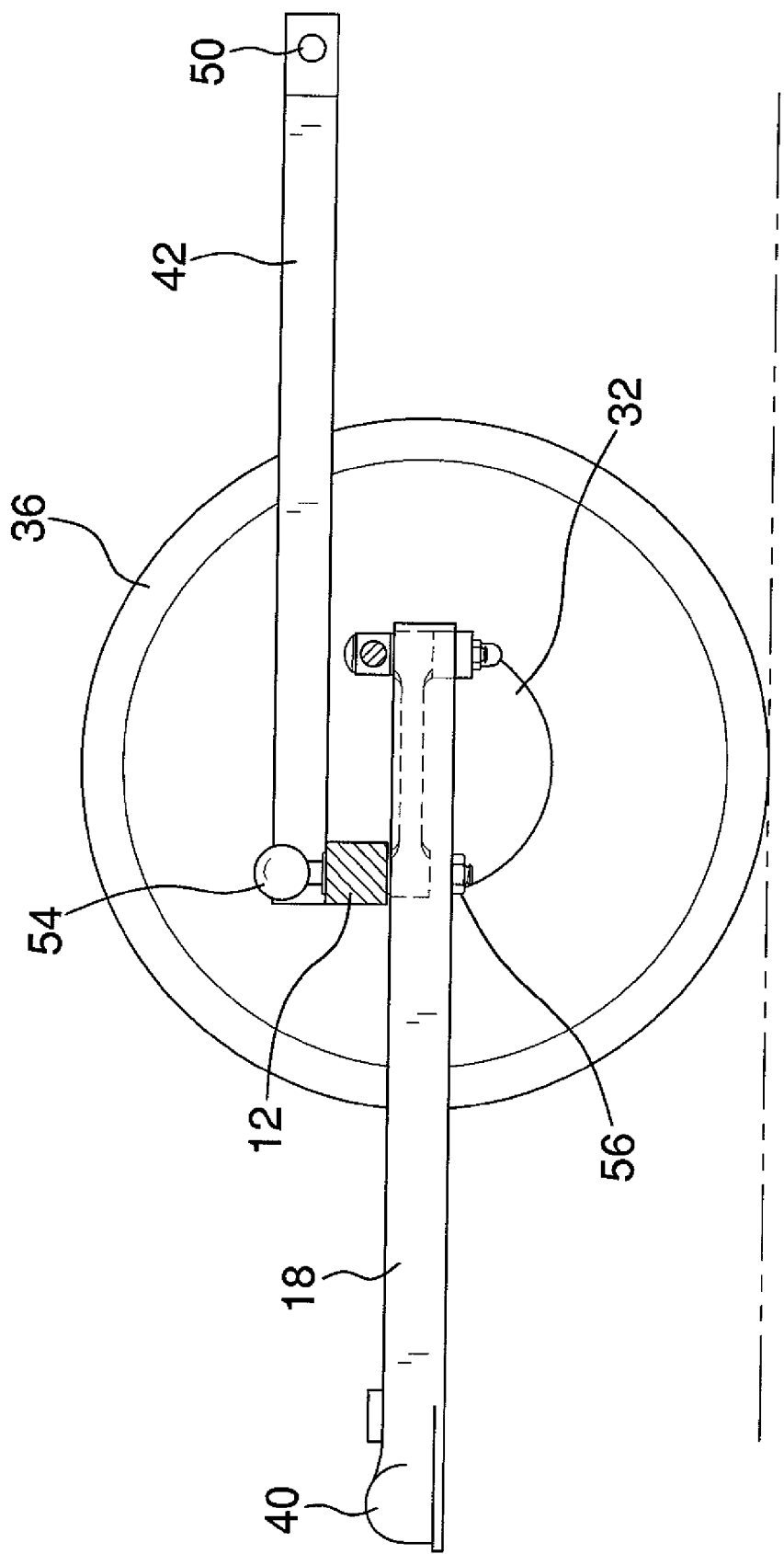
FIG. 3 is a side view of an embodiment of the disclosure.
Figure 4:
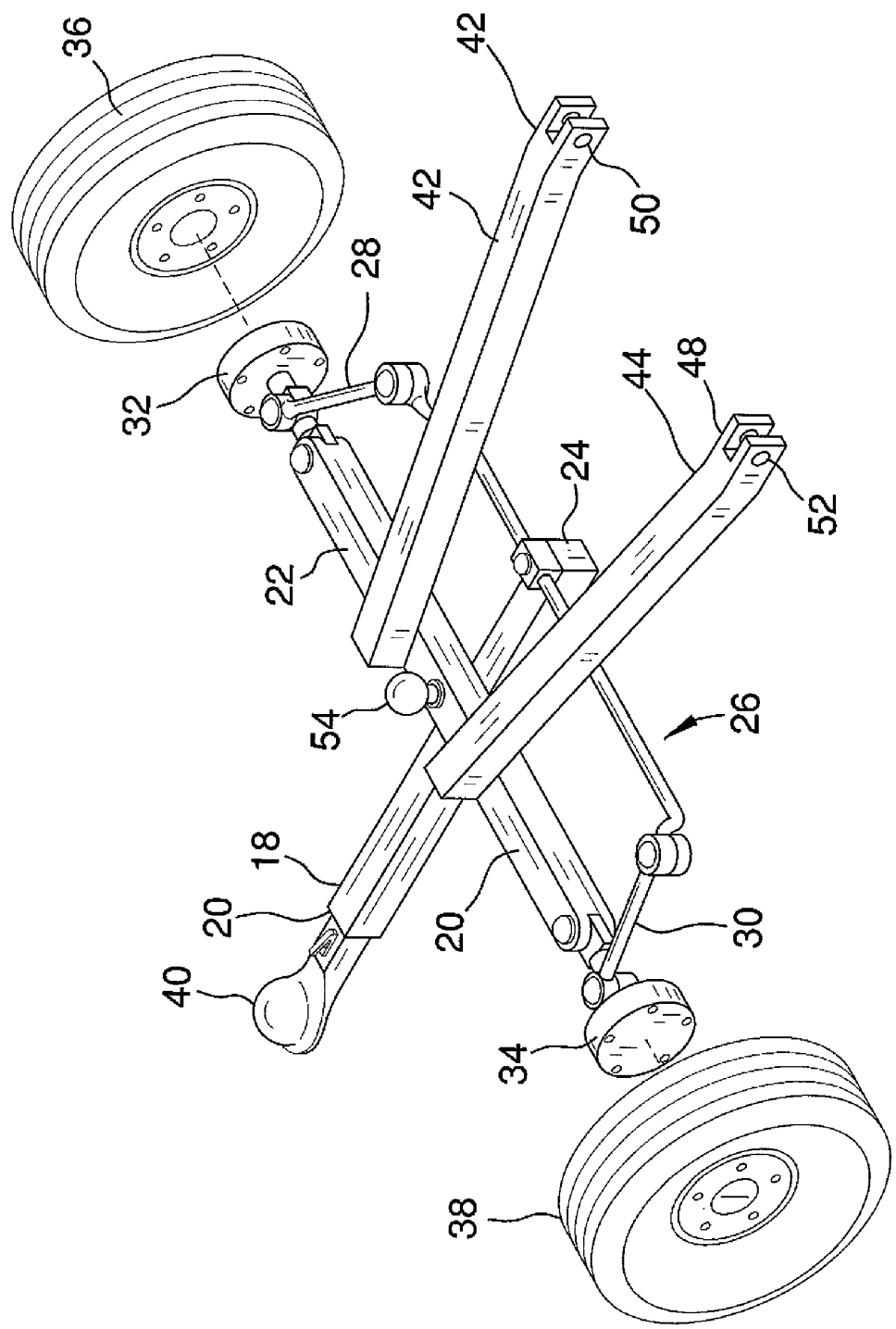
FIG. 4 is a top rear perspective partially exploded view of an embodiment of the disclosure.
Figure 5:
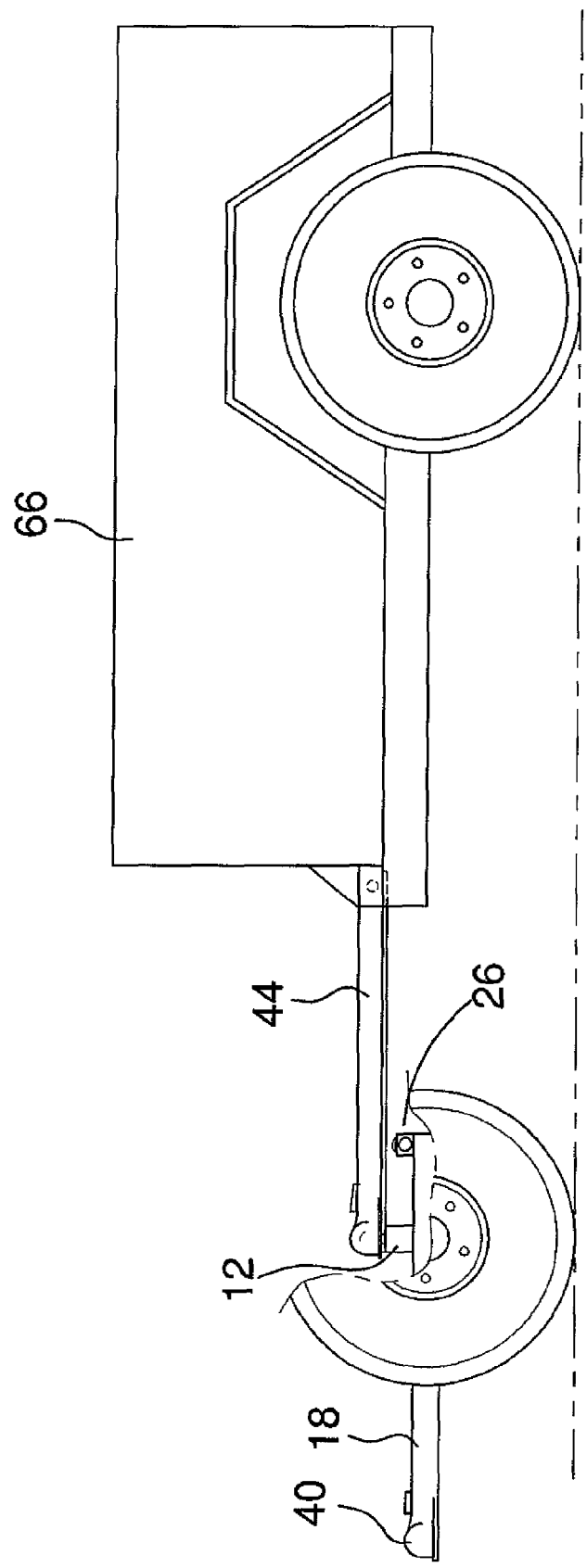
FIG. 5 is a partial cut-away side view of an embodiment of the disclosure in use.

With reference now to the drawings, and in particular to FIGS. 1 through 5 thereof, a new trailer support embodying the principles and concepts of an embodiment of the disclosure and generally designated by the reference numeral 10 will be described.

As best illustrated in FIGS. 1 through 5, the trailer hitch carriage assembly 10 generally comprises an axle 12 having pivotable distal end portions 14,16. A tow bar 18 is pivotally coupled to a central portion 20 of the axle 12. The tow bar 18 has a proximal end 22 and a distal end 24. A tie rod assembly 26 is coupled to the distal end 24 of the tow bar 18. The tie rod assembly 26 includes a pair of distal end portions 28,30. Each distal end portion 28,30 of the tie rod assembly 26 is pivotally coupled to a respective one of the distal end portions 14,16 of the axle 12. A pair of hubs 32,34 is provided. Each hub 32,34 is coupled to a respective one of the distal end portions 14,16 of the axle 12. A pair of wheels 36,38 is provided. Each wheel 36,38 is rotationally coupled to a respective one of the hubs 32,34. A trailer hitch receiver 40 is coupled to the proximal end 22 of the tow bar 18.

A pair of stabilizer bars 42,44 is coupled to the axle 12. Each stabilizer bar 42,44 extends away from the proximal end 22 of the tow bar 18. Each stabilizer bar 42,44 has a respective notched distal end 46,48 with a pair of aligned apertures 50,52 extending through the notched distal end 46,48 such that each stabilizer bar 42,44 is designed for coupling to a trailer 66. The stabilizer bars 42,44 each have a proximal end 58,60. The proximal ends 58,60 are fixedly coupled to the axle 12. Each stabilizer bar 32,44 extends away from the axle 12 at an angle such that the proximal ends 58,60 of the stabilizer bars 42,44 are spaced closer together than the notched distal ends 46,48 of the stabilizer bars 42,44.

A ball hitch 54 is coupled to the axle 12. The ball hitch 54 is positioned in alignment with a pivot point 56 between the axle 12 and the tow bar 18. Each pair of aligned apertures 50,52 is aligned with respect to the other. The central portion 20 of the axle 12 has a square cross-section. Each stabilizer bar 42,44 has a flat top surface 62,64. The top surfaces 62,64 of the stabilizer bars 42,44 are coplanar.

In use, the trailer 66 is coupled to the ball hitch 54 such that the wheels 36,38 and axle 12 support weight from the trailer 18 66 and facilitate moving the trailer 66 and coupling the trailer 66 to a towing vehicle. The tow bar 18 is coupled to the towing vehicle using the trailer hitch receiver 40. While being towed, the tie rod assembly 26 assists to steer the wheels 36,38. The stabilizer bars 42,44 may also be coupled directly to the trailer 66 to further stabilize the trailer 66 during towing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A trailer hitch carriage assembly comprising:
    an axle having pivotable distal end portions;
    a tow bar pivotally coupled to a central portion of said axle, said tow bar having a proximal end and a distal end;
    a tie rod assembly coupled to said distal end of said tow bar, said tie rod assembly having a pair of distal end portions, each distal end portion of said tie rod assembly being pivotally coupled to a respective one of said distal end portions of said axle;

a pair of hubs, each hub being rotationally coupled to a respective one of said distal end portions of said axle;

a pair of wheels, each wheel being coupled to a respective one of said hubs;

a trailer hitch receiver coupled to said proximal end of said tow bar; and a ball hitch coupled to said axle;

a pair of stabilizer bars coupled to said axle and extending away from said proximal end of said tow bar, each stabilizer bar having a notched distal end and a pair of aligned apertures extending through said notched distal end such that each stabilizer bar is adapted for coupling to a trailer.

2. The trailer hitch carriage assembly of claim 1, wherein said ball hitch is positioned in alignment with a pivot point between said axle and said tow bar.

3. The trailer hitch carriage assembly of claim 1, further comprising:

said stabilizer bars each having a proximal end, said proximal end being fixedly coupled to said axle; and each said stabilizer bar extending away from said axle at an angle such that said proximal ends of said stabilizer bars are spaced closer together than said notched distal ends of said stabilizer bars.

4. The trailer hitch carriage assembly of claim 1, wherein each pair of aligned apertures is aligned.

5. The trailer hitch carriage assembly of claim 1, wherein said central portion of said axle has a square cross-section.

6. The trailer hitch carriage assembly of claim 1, wherein each stabilizer bar has a flat top surface.

7. The trailer hitch carriage assembly of claim 6, wherein said top surfaces of said stabilizer bars are coplanar.

8. A trailer hitch carriage assembly comprising:

an axle having pivotable distal end portions;

a tow bar pivotally coupled to a central portion of said axle, said tow bar having a proximal end and a distal end;

a tie rod assembly coupled to said distal end of said tow bar, said tie rod assembly having a pair of distal end portions, each distal end portion of said tie rod assembly being pivotally coupled to a respective one of said distal end portions of said axle;

a pair of hubs, each hub being rotationally coupled to a respective one of said distal end portions of said axle;

a pair of wheels, each wheel being coupled to a respective one of said hubs;

a trailer hitch receiver coupled to said proximal end of said tow bar;

a pair of stabilizer bars coupled to said axle and extending away from said proximal end of said tow bar;

wherein each stabilizer bar has a notched distal end and a pair of aligned apertures extending through said notched distal end such that each stabilizer bar is adapted for coupling to a trailer;

a ball hitch coupled to said axle;

wherein said ball hitch is positioned in alignment with a pivot point between said axle and said tow bar;

said stabilizer bars each having a proximal end, said proximal end being fixedly coupled to said axle;

each said stabilizer bar extending away from said axle at an angle such that said proximal ends of said stabilizer bars are spaced closer together than said notched distal ends of said stabilizer bars;

wherein each pair of aligned apertures is aligned;

wherein said central portion of said axle has a square cross-section;

wherein each stabilizer bar has a flat top surface; and wherein said top surfaces of said stabilizer bars are coplanar.

\* \* \* \* \*